US007634694B2

(12) United States Patent
Green et al.

(10) Patent No.: US 7,634,694 B2
(45) Date of Patent: Dec. 15, 2009

(54) SELECTIVE SCRAMBLER FOR USE IN A COMMUNICATION SYSTEM AND METHOD TO MINIMIZE BIT ERROR AT THE RECEIVER

(75) Inventors: Christopher M. Green, Austin, TX (US); David J. Knapp, Austin, TX (US); Horace C. Ho, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 792 days.

(21) Appl. No.: 10/966,254

(22) Filed: Oct. 15, 2004

(65) Prior Publication Data

US 2006/0083328 A1    Apr. 20, 2006

(51) Int. Cl.
G06F 11/00    (2006.01)
(52) U.S. Cl. .................. 714/701; 375/295; 375/319; 714/751; 714/775; 327/307; 380/210; 341/58
(58) Field of Classification Search .............. 375/312, 375/316–317, 319, 295–297, 309; 327/100, 327/306–307; 341/50–107; 713/181; 714/699, 714/701, 751, 762, 776, 777; 380/200, 210
See application file for complete search history.

(56) References Cited

U.S. PATENT DOCUMENTS 3,988,538 A    10/1976    Patten (Continued)

FOREIGN PATENT DOCUMENTS

EP    0134817    2/1991

WO    02/062443    8/2002

OTHER PUBLICATIONS

European Search Report for EP 05021620.9 mailed Nov. 6, 2008.

(Continued)

*Primary Examiner*—Shuwang Liu
*Assistant Examiner*—James M Perez
(74) *Attorney, Agent, or Firm*—Kevin L. Daffer; Daffer McDaniel, LLP

(57) ABSTRACT

A communication system for transmitting and receiving a sequence of bits, and the methodology for transferring that sequence of bits are provided. The communication system includes a transmitting circuit and a receiving circuit. Within the transmitting circuit is a scrambler that comprises a shift register, an enable circuit, and an output circuit. The shift register temporarily stores n bits within the sequence of bits, and the enable circuit enables the shift register to store bits that arise only within the payload section of a frame. The output circuit includes a feedback, and several taps within the n stages to scramble logic values within the sequence of n bits output from the shift registers thus effectively preventing in most instances the sequence of bits from exceeding n number of the same logic value. Within the receiving circuit is a descrambler also having a shift register, an enable circuit, and an output circuit. The descrambler recompiles the scrambled data back to its original form. The scrambler is preferably placed before an encoder in the transmission path to minimize data dependent, low frequency jitter. The encoder is used to place a coding violation into the frame to signal the beginning of each frame, and to encode the parity with an offset against any DC accumulation of the coding violation and the scrambled payload to eliminate all DC accumulation (baseline wander) within each frame.

20 Claims, 8 Drawing Sheets

U.S. PATENT DOCUMENTS

| | | | |
|---|---|---|---|
| 4,661,950 A * | 4/1987 | Kobayashi et al. | 370/445 |
| 5,655,078 A * | 8/1997 | Anderson et al. | 375/295 |
| 5,917,852 A * | 6/1999 | Butterfield et al. | 375/141 |
| 5,946,355 A | 8/1999 | Baker | |
| 6,349,138 B1 * | 2/2002 | Doshi et al. | 380/200 |
| 6,437,710 B1 * | 8/2002 | Tam et al. | 341/58 |
| 6,738,935 B1 * | 5/2004 | Kimmitt | 714/701 |
| 6,741,636 B1 | 5/2004 | Lender | |
| 6,754,190 B2 | 6/2004 | Gurney et al. | |
| 7,284,184 B2 * | 10/2007 | Gallezot et al. | 714/762 |
| 2004/0091106 A1 * | 5/2004 | Moore et al. | 380/37 |

OTHER PUBLICATIONS

Kraemer et al., "A 32 MBit/s CMOS Integrated Transceiver with an Analog PLL for a Fiber Optic Data Link," IEEE Custom Integrated Circuits Conference, 1986, pp. 157-160.

Farrell et al., "2 ×140 MBit/s Muldex Equipment for an Optical Fibre Transmission System," International Conference on Telecommunication Transmission into the Digital Era, 1981, pp. 49-52.

* cited by examiner

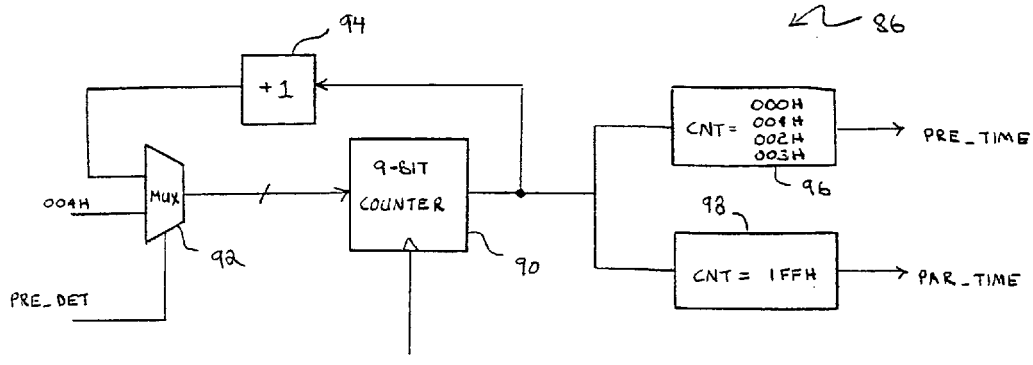
FIG. 13
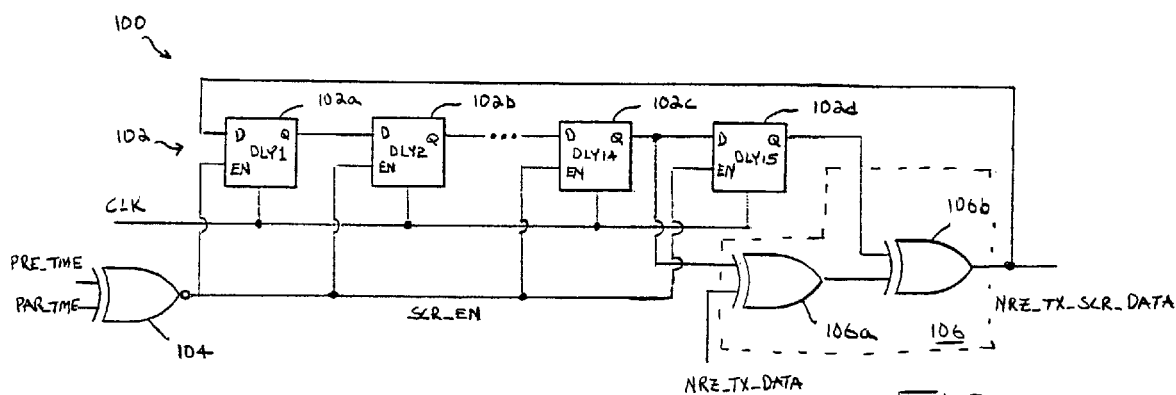
FIG. 14
| NRZ_TX_DATA | DLY14 | DLY15 | NRZ_TX_SCR_DATA |
|---|---|---|---|
| 0 | 0 | 0 | 0 |
| 1 | 0 | 0 | 1 |
| 0 | 1 | 0 | 1 |
| 1 | 1 | 0 | 0 |
| 0 | 0 | 1 | 1 |
| 1 | 0 | 1 | 0 |
| 0 | 1 | 1 | 0 |
| 1 | 1 | 1 | 1 |
FIG. 15

SELECTIVE SCRAMBLER FOR USE IN A COMMUNICATION SYSTEM AND METHOD TO MINIMIZE BIT ERROR AT THE RECEIVER

BACKGROUND OF THE INVENTION

1. Field of the Invention

This invention relates to a communication system and, more particularly, to a scrambler circuit in a transmitter that can randomize the logic values of a sequence of bits within a data stream sent across a transmission path. The scrambler circuit selectively scrambles only a payload section of a frame of bits to minimize low frequency jitter within the data stream and, following scrambling of only the payload, an encoder can be used to encode all sections of the frame to minimize other causes of jitter, such as DC accumulation (or baseline wander) in the data stream.

2. Description of the Related Art

The following descriptions and examples are not admitted to be prior art or conventional by virtue of their inclusion within this section.

A communication system generally contains at least two nodes interconnected by a transmission path. Each node may include both a transmitter and a receiver, generally referred to as a transceiver. The transceiver provides an interface between signals sent over the transmission path and an electronic subsystem that operates upon that signal in the digital domain. The interconnected nodes can be organized according to various topologies, such as bus, ring, star, or tree topology. The transmission path between nodes can be either wired or wireless, and it is preferred that the transmission path accommodate different types of data. For example, the path may be called upon to transfer packetized data or streaming data.

While streaming data has a temporal relationship between samples produced from a source onto the network, packetized data need not be time-related since the packets are typically stored and used later by the destination device. The streaming data can be sent either as isochronous streaming data or synchronous streaming data depending on the sample rate (fs) local to a node and the frame synchronization rate (FSY) of the transmission path. When sending a bitstream of packetized or streaming data across the transmission path, it is beneficial to know the location of such data within a payload relative to the preamble and parity sections of that frame. Thus, a frame of data sent as a data stream includes a payload section, a preamble section and, in some instances, a parity section. The preamble section can be used to generate FSY, while the parity section can be used to detect any errors in transmission and, possibly, correct those errors.

Regardless of what type of data is being sent across the transmission path or the arrangement of the payload relative to the parity and preamble sections, the transmission path and the receiver are time dispersive. In other words, the transmission path and receiver will more readily transfer certain frequency components of a data stream than other frequencies and thus their frequency response is not flat. For example, the transmission path has certain low-pass characteristics. When receiving a data stream that consists of symbols, the transmission path has the effect of widening each symbol in time, thus causing what is known as inter-symbol interference, or ISI. ISI can result in the loss or incorrect communication of certain bits within the data stream. As another example, the receiver itself might also exhibit low-pass and/or high-pass characteristics. When coupled with a phase-locked loop (PLL) at the receiver for recovering a clock signal, the additional low-pass filter within the PLL will further attenuate the higher frequency components of the data stream.

The frequency response of the transmission path, receiver, and PLL, attribute to errors in the recovery of transmitted data streams that have variations in pattern density. For example, sufficient variations in density might cause a skewing in the direct current (DC) baseline seen by a decision circuit located in the receiver. If the DC value changes over time, the decision circuit might temporarily displace the moment in which it samples a transition of the incoming data stream. Thus, the variations in pattern density which create DC accumulation, oftentimes referred to as baseline wander, can cause jitter in the output of the receiver. Moreover, if the output is used to recover a clocking signal, the jitter will be induced into the sample transitions of the clocking signal to produce bit errors in the recovered data stream.

Even in instances in which there is little if any baseline wander, jitter may still be present in the output data stream. For example, if the data stream sent across the transmission path has relatively even high density patterns relative to low density patterns, the decision circuit, oftentimes referred to as a "slicer," operates as a comparator connected to slice the transferred data at different amplitude points along the waveform edges, and the finite rise and fall times of such edges are dependent on the sparse and dense incoming data stream transitions. If the period between sparse and dense transitions occurs at a frequency within the low-pass response of the PLL low pass filter (below the PLL low pass filter cutoff corner), then additional jitter will be imparted to the recovered output.

It would be desirable to introduce a communication system having a transmitting circuit and receiving circuit that will minimize baseline wander and modify any data dependent jitter frequency to be above the PLL low pass cutoff. The desired communication system can, therefore, minimize any low frequency jitter accumulation around a ring-based network. It would be further desirable to selectively remove such jitter from only the payload section since it is beneficial that the preamble and parity sections are to be coded. The desired preamble and parity sections are coded to synchronize the frame (and sections within the frame) and to eliminate all effects of baseline wander below the frame rate and to ensure the coded frame is DC free (i.e., has no DC accumulation as read by the receiver). Moreover, the desired communication system should be one that can accommodate all types of packetized and streaming data within a frame and, specifically, the payload section of a frame.

SUMMARY OF THE INVENTION

The problems outlined above are in large part solved by an improved communication system for transmitting and receiving a sequence of bits. The communication system can transfer packetized and streaming (synchronous and isochronous) data within each frame of a sequence of frames sent across a transmission path. The transmission path can be wired (which includes coaxial cable, copper, optical fiber, etc.) or wireless and the transmission path can be connected between nodes organized in various topologies.

Each frame can either have timeslots within the payload section reserved for different data types, or a command can be placed within the payload section followed by a data type corresponding to that command. The frame is preferably sent synchronously across the topology between nodes and each frame is synchronized to FSY. FSY can be the same as or slightly different from fs to accommodate synchronous streaming data or isochronous streaming data.

To ensure each frame is properly received with timeslots allocated within the payload section and synchronized by the preamble section with error detection/correction in the parity section, an encoder can be used to code a violation within the preamble section, as detected by a decoder in the receiver. Along with the preamble section, a parity section is also coded to ensure that the entire frame does not contain any DC content when received upon the receiver. The parity section is thereby coded to offset any potential DC content in the preamble and the scrambled payload. Since the preamble and parity sections calculated to ensure a coding violation and that each frame is DC free, these sections cannot be scrambled since, if these sections were scrambled, the preamble may no longer signal a coding violation at the receiver's decoder and the parity may no longer signal a DC offset from the rest of the frame to ensure the entire frame is DC free.

Even though the preamble and parity sections are coded to eliminate DC accumulation at each frame—and thus at the frame rate (FSY)—relatively long jitter periods can exist in the payload section within a frame and over many frames. The payload is therefore scrambled using a memory device that can capture and hold a sequence of bits. Examples of such a memory device includes random access memory, registers, latches, flip flops, and the like. If a shift register is used, then preferably a linear feedback shift register (or LFSR) can capture the sequence of bits. A LFSR is defined as a shift register having n delay elements, such as D-type flips flops, coupled in series. At least one tap is drawn from the outputs of at least one of the delay elements, and preferable two taps are drawn from two outputs. The taps are fed into an output circuit, and an output of the output circuit is fed back to an input of the first delay element in the sequence.

The LFSR is used to randomize the logic value of a sequence of bits fed into the n delay elements. The n bits temporarily stored in the n stages can be randomized by inverting or maintaining the logic values of one or more of the n bits stored in the LFSR, hereinafter simply referred to as a shift register. According to one embodiment, the logic value of the first bit within the sequence of bits stored in the n stages is inverted if the second bit within the sequence of bits stored in the n stages is dissimilar from the logic value of the nth bit within the sequence of bits stored in the n stages. According to another embodiment, the logic value of the first bit within the sequence of bits stored in the n stages is maintained at the same logic value if the second bit within the sequence of bits stored in the n stages is similar to the logic value of the nth bit within the sequence of bits stored in the n stages. According to yet another embodiment, and depending on how the shift register is initialized, dissimilar logic values are inserted into the sequence of bits having a similar logic value exceeding n in number.

The transmitting circuit of the improved communication system includes a scrambler that implements the LFSR to scramble (or randomize) only the payload section of the data stream, and an encoder that encodes the entire frame including the payload section, preamble section, and parity section. The encoded and selectively scrambled data stream can then be sent across the transmission path with no baseline wander at frequencies below the frame transfer rate (FSY) and with minimal low frequency data dependent jitter.

A decoder at the receiver can detect the coding violation in the preamble and determine the beginning of each frame and, more particularly, where the payload section and parity section resides relative to each frame. The decoder can also be used to decode the encoded frame, and the decoded bitstream is then forwarded to a descrambler which descrambles the payload. The descrambled payload and the decoded preamble and parity sections, therefore, benefit from a more accurate recovery of the original data stream sent from the source onto the transmission path, absent any bit errors caused by baseline wander or jitter.

According to one embodiment, the transmitting circuit includes a scrambler. The scrambler can comprise a shift register, an enable circuit, and an output circuit. The shift register may include n stages. The enable circuit can be coupled to the shift register for enabling the shift register to shift in time the sequence of bits within only a payload section of the frame. The output circuit can be coupled to the shift register for preventing the sequence of bits output from the shift register from containing a repeating sequence of the same logic values. The shift register and output circuit with feedback (LFSR) thereby randomizes the sequence of bit values fed to the transmitting circuit and effectively shifts any data dependent jitter upward in frequency so that it can be more effectively removed by the low pass filter within the PLL of a receiving circuit.

According to another embodiment, a communication system is provided for transmitting and receiving a sequence of bits. The communication system includes a scrambler and an encoder for sending scrambled and coded bits into a transmission path. The communication system further includes a decoder and a descrambler for decoding the coded bits and descrambling the scrambled bits sent across the transmission path. The scrambler can be coupled to temporarily store n bits of the sequence of bits, and to invert a logic value of the first bit if a logic value of the second bit and the nth bit are dissimilar. The descrambler is coupled to temporarily store the decoded n bits in a shift register with feed forward, instead of feedback. The descrambler thereby inverts a logic value of the first bit if the logic value of the second bit and the nth bit are dissimilar. If the second bit and nth bit are similar, then the first bit is maintained in its current state.

According to yet another embodiment, a method is provided for transferring a sequence of bits. The method includes the steps of substituting a substantially random set of logic values among n bits of a sequence of bits to decrease a jitter period to preferably less than n bits. The method also includes changing the transition period of the substantially random set of logic values to eliminate DC accumulation or baseline wander. The dissimilar logic values and changed transition periods can then be transferred across the transmission medium. Thereafter, the transition period of the n bits can be changed again subsequent to transferring such bits across the transmission medium or path. Similar logic values can thereafter be substituted among the sequence of bits to complete the reconstruction of the coded and scrambled bits prior to being coded and scrambled.

BRIEF DESCRIPTION OF THE DRAWINGS

Other objects and advantages of the invention will become apparent upon reading the following detailed description and upon reference to the accompanying drawings in which:

FIG. 13 is a block diagram of a state machine used to set the time in which preamble bits and parity bits are encountered, relative to the payload;

FIG. 14 is a block diagram of the scrambler circuit that selectively scrambles the payload during times when the preamble bits and the parity bits are not encountered;

FIG. 15 is a truth table of the combinatorial logic of the output circuit of FIG. 14;

Figure 1:
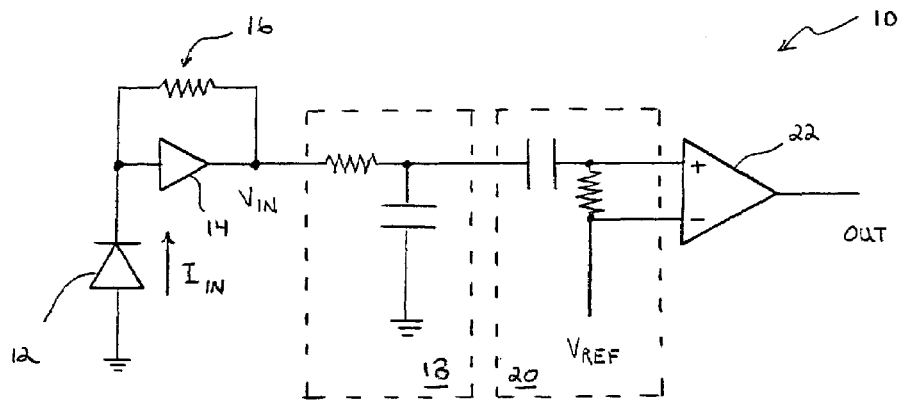
FIG. 1 is a circuit schematic of a receiver having a bandpass filter and decision circuit for converting a data stream sent across an optical transmission path to a series of logic values.

While the invention is susceptible to various modifications and alternative forms, specific embodiments hereof are shown by way of example in the drawings and will herein be described in detail. It should be understood, however, that the drawings and detailed description thereto are not intended to limit the invention to the particular form disclosed, but on the contrary, are intended to cover all modifications, equivalents, and alternatives falling within the spirit and scope of the present invention as defined by the appended claims.

DETAILED DESCRIPTION OF PREFERRED EMBODIMENTS

Turning now to the drawings, FIG. 1 illustrates a receiver 10 that is coupled to receive a data stream sent across a transmission path, such as a wired or wireless transmission path. Receiver 10 can be placed into a node that also contains a transmitter. Each node of the communication system can therefore include a transceiver. If an optical fiber is used, then receiver 10 can convert light energy to an electrical signal upon photosensor 12. Photosensor 12 converts optical energy into electrical energy, such as current $I_{IN}$. An amplifier or buffer 14 and load resistor 16 convert $I_{IN}$ to an input voltage $V_{IN}$.

Associated with the transmission path and/or receiver 10 is a low-pass filter 18. The frequency response of the low-pass filter depends on the resistor and capacitor values within filter 18. Also associated with receiver 10 is a high-pass filter 20. Filter 20 includes a blocking capacitor and a resistor. The resistor produces the voltage across the positive and negative terminals of a decision circuit, slicer, or comparator 22. Comparator 22 compares the incoming voltage $V_{IN}$ as filtered through the high- and low-pass filters 18 and 20, respectively, to a reference voltage ($V_{REF}$).

The reference voltage is placed at a threshold preferably between the logic high (logic 1) value and the logic low (logic 0) value of the incoming data stream. The logic high/1 value is any value that is greater in magnitude than the logic low/0 value. As the leading edge of a pulse (as filtered) is received on the non-inverting input of comparator 22, that edge is compared to the reference voltage and the moment the rising edge exceeds the reference voltage, then comparator 22 will output a logic 1 value. The opposite is true if the incoming voltage decreases below the reference voltage, causing the output from comparator 22 to transition to a logic 0 voltage value.

Figure 2:
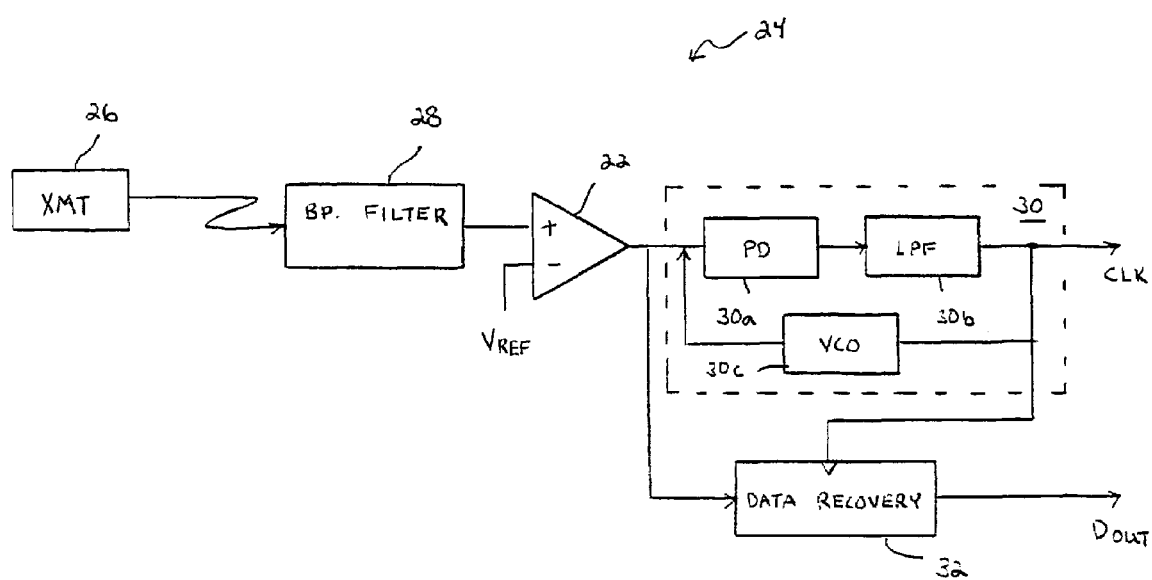
FIG. 2 is a block diagram of the receiver in FIG. 1 having a PLL to recover a clock signal from the received data stream, and for using the clock signal to recover the data stream.

As seen in FIG. 1, receiver 10 includes a low-pass filter 18 and a high-pass filter 20, which combine to form a band-pass filter with cutoff frequencies spaced from each other to form the bandpass. FIG. 2 illustrates a communication system 24 having a transmitter 26 coupled to send a data stream into the bandpass filter 28 of a receiver that also includes decision circuit 22, a clock recovery circuit 30, and a data recovery circuit 32.

Clock recovery circuit 30 can include a PLL that comprises a phase detector 30a, a low-pass filter 30b, and a voltage-controlled oscillator 30c coupled in feedback arrangement. Low-pass filter 30b removes any high frequency jitter caused by the phase detector and the oscillator frequency being fed back from the voltage-controlled oscillator 30c. At the output of low-pass filter 30b is a clock signal used to sample the logic high and logic low voltage values output from decision circuit 22. The sampling operation takes place within data recovery circuit 32 to produce a data output signal $D_{OUT}$.

Figure 3:
FIG. 3 is a timing diagram DC accumulation of a data stream on a receiver, resulting from a periodic frequency outside the bandpass of the receiver.

FIG. 3 illustrates, in exaggerated form, an inherent problem whenever the logic high density of the data stream sent across the transmission path varies. For example, as the logic high density decreases as shown, the DC baseline may wander upward in voltage value due to the change in average value of the data pattern. The blocking capacitor on the high-pass filter corner can, therefore, prevent the logic low voltage values from dropping far enough below the non-inverting input on the comparator. This causes an upward skewing and an earlier triggering of the slicer/decision circuit during moments of low logic high density. The baseline is shown in dashed line and is preferably set near the reference voltage $V_{REF}$.

Figure 4:
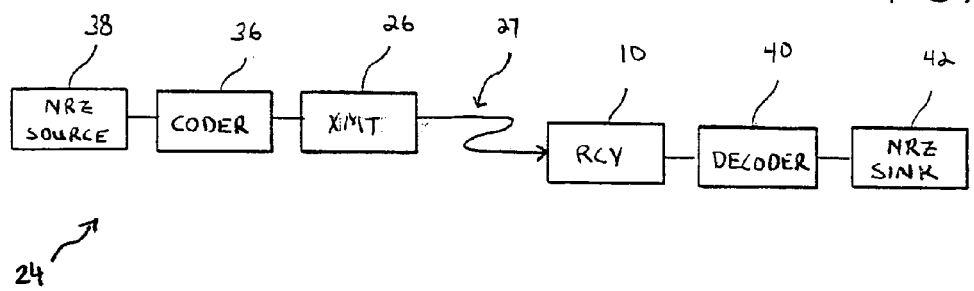
FIG. 4 is a block diagram of a communication system having an encoder to minimize DC accumulation.

FIG. 4 illustrates a communication system 24 having a coder and decoder placed in the transmitting and receiving paths, respectively. The coder or encoder 36 takes the non-return to zero (NRZ) bitstream from source 38 and codes the bitstream with a code that has a lessened amount of baseline wander to minimize the problem shown in FIG. 3. The coded signal is then sent by a transmitter 26 across transmission path 27 to a receiver 10. Since the received signal is a coded signal absent substantial baseline wander, the receiver can more accurately recover the serial bitstream. However, the coded bitstream must be decoded by decoder 40. Once decoded, the NRZ bitstream is applied to the target destination device, or sink 42.

Figure 5:
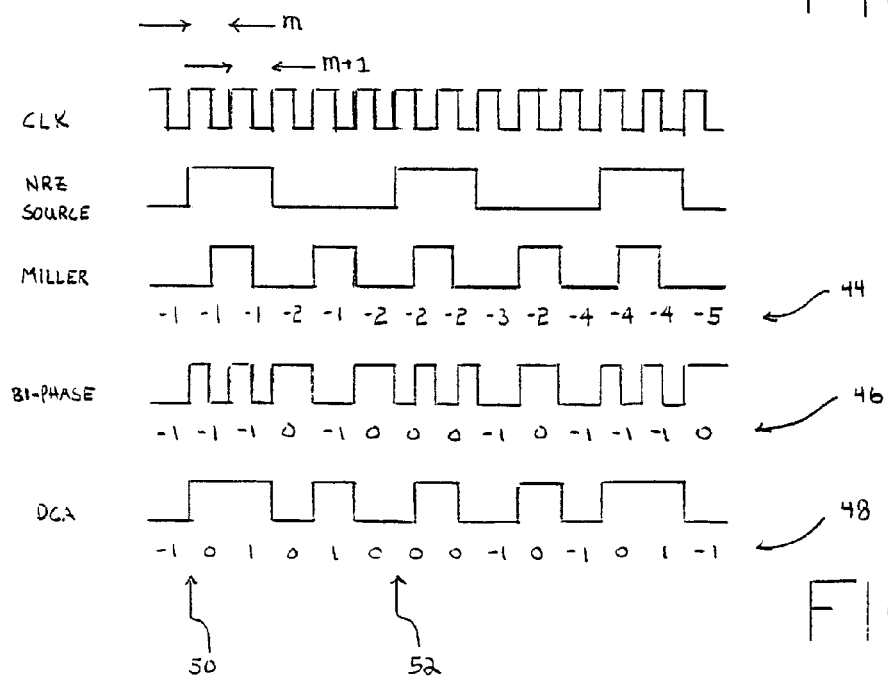
FIG. 5 is a timing diagram of different coding schemes and the DC accumulation of each.

There are numerous types of coding methodologies. Preferably, whatever code is being used, the output from the coder has little, if any, DC accumulation or codes that would cause a baseline wander at the input of a receiver. As shown in FIG. 5, three encoding methodologies are shown: Miller, biphase, and DC-adaptive (DCA). Descriptions of the three different types of encoding is set forth in U.S. Pat. No. 6,437,710 herein incorporated by reference in its entirety. Miller encoding occurs at the same data rate as the source data rate, yet a high logic voltage value is encoded by a transition at the center of the clock phase, while a logic low voltage value is encoded by transitions at the boundary of the clock phase. In biphase coding, the data rate is coded at twice the source data rate whenever the source data encounters a logic high value, yet encodes at the source data rate whenever the source data encounters a logic low value. Biphase coding thereby suffers moments in which the encoded data rate is twice the source data rate.

As shown, Miller encoding undergoes an accumulated DC voltage value 44 that skews negative in this example. A transition at the middle of a clock cycle or phase represents no change in DC value, however, a downward logic value throughout a clock cycle will reduce the accumulated DC value by one count quantity as shown in this example. The accumulated DC voltage value for biphase coding 46 does not skew downward beyond acceptable bounds as does the Miller coding scheme. Thus, biphase coding will not accumulate voltages upon the input capacitor of filter 20 (FIG. 1).

Similar to biphase coding, DC-adaptive (DCA) coding 48 also does not incur out-of-bounds DC accumulation. The DCA encoding mechanism essentially operates on a clock-cycle-by-clock-cycle basis. The DCA encoder will encode a logic high voltage value occurring during an m clock cycle by producing a transition 50 near the beginning of the m clock cycle. The transition will occur, however, if a logic high voltage value exists during an m+1 clock cycle and the sum of DC voltage values 48 of all coded logic high and low voltage values is skewed toward either the logic high voltage value or the logic low voltage value prior to the m clock cycle. If there is no pre-existing skewing of the sum of DC voltage values 48, as shown by transition 52, then the encoder will encode a logic high voltage value by producing a transition in the middle of the clock cycle.

Figure 6:
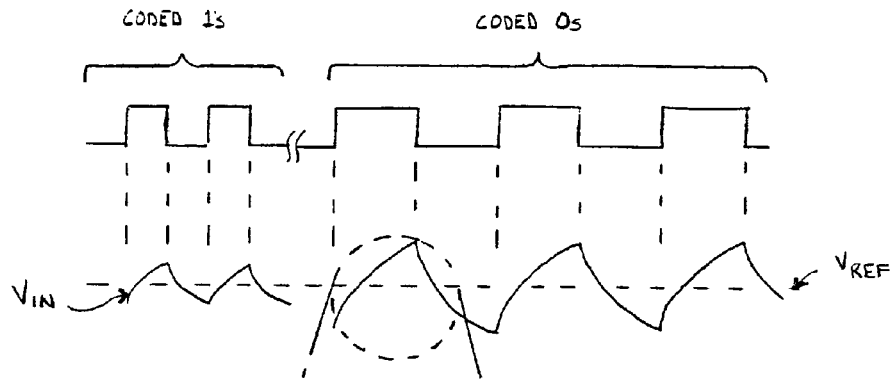
FIG. 6 is a timing diagram of jitter output from a decision circuit of a receiver between when the receiver receives a biphase coded 0 logic value and a biphase coded 1 logic value.

The output from coder 36 (FIG. 4) can produce different pattern densities depending on the coding mechanism used. For example, biphase encoding, while exhibiting minimal baseline wander at the receiver, produces different transition rates, as shown in FIG. 6. For example, logic high (i.e., coded 1 logic values) transition at twice the rate as coded 0 logic values. Given the frequency response of the low-pass filter 18 configured at the input of receiver 10 (FIG. 1), the input voltage VIN will have a longer time to rise and fall for coded 0s than coded 1s, as shown in FIG. 6. Thus, when a sequence of logic 0 voltage values are encountered, the voltage at the non-inverting input of the comparator will reach higher and lower amplitude levels than for bit patterns of coded 1s.

Relative to the reference voltage $V_{REF}$, it takes longer for the rising edge of a coded 0 logic value to reach $V_{REF}$ than for the rising edge of the coded 1 logic value. The same is true for the falling edge of a coded 0 logic value relative to a falling edge of a coded 1 logic value. The time to reach the reference voltage for a coded 1 is shown as $T_1$, and the time to reach the reference voltage for a coded 0 is shown as $T_0$. The time difference between $T_0$-$T_1$ occurs at the interface between each coded 1 and coded 0 for biphase coded patterns. The time difference or $\Delta T$ value presented at each interface produces a jitter period between interfaces as shown in FIGS. 7 and 8.

The jitter period forms as a pattern between alternating coded 1s and coded 0s. The frequency of jitter is, therefore, equal to the rate at which the pattern changes between a coded 1 and a coded 0. If the PLL locks the transitions of $D_{OUT}$, the transfer function of the PLL and, specifically, the low-pass filter of the PLL, it may allow passage of jitter depending on where the low-pass filter corner exists relative to the jitter frequency.

Figure 7:
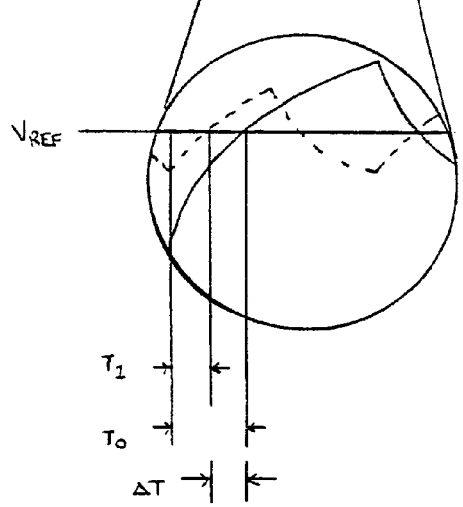
FIG. 7 is a blow up diagram of the interface between the coded 0 logic value output and the coded logic 1 value output of FIG. 6.
Figure 8:
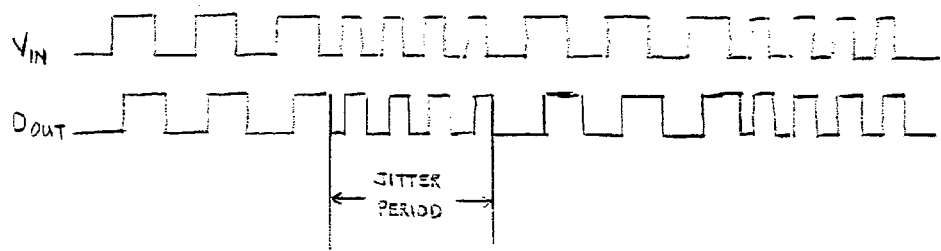
FIG. 8 is a timing diagram of a jitter period between neighboring interfaces of FIG. 6.
Figure 9:
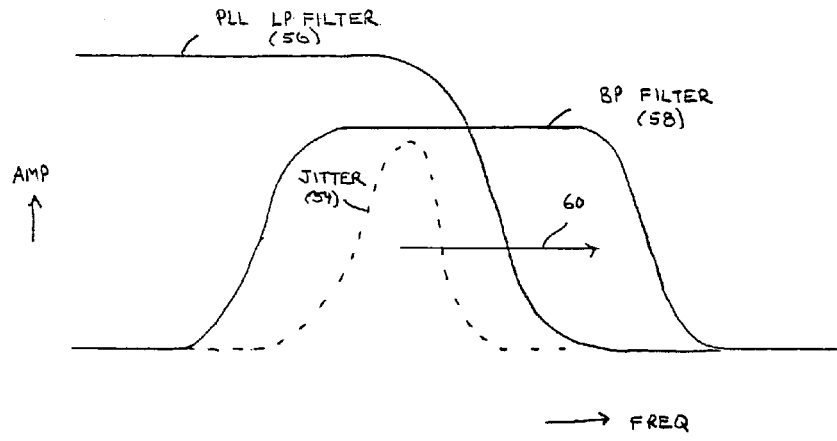
FIG. 9 is a graph of frequency versus amplitude of the jitter relative to the PLL low pass filter and the bandpass filter of the receiver to show passage of jitter within the bandpass and below the low pass of the PLL.

The jitter shown in FIGS. 6-8 is, therefore, dependent on the data pattern and is oftentimes referred to as data dependent jitter. As shown in FIG. 9, if the data dependent jitter frequency 54 is below the frequency response of the PLL low-pass filter 56. The jitter will then be transferred onto the recovered clock output from the receiver. The transferred jitter may cause substantial errors in recovery of the originally transmitted NRZ source. Moreover, a jitter on the recovered clock will produce distortion on signals produced by any analog-to-digital or digital-to-analog converters clocked by the recovered clock It would be desirable to increase the frequency of the jitter so that its frequency response is above the frequency cutoff of the low-pass filter within the PLL, and/or possibly above the low-pass filter corner of the bandpass filter. Thus, as shown in FIG. 9, it would be beneficial to increase the frequency response of jitter 54 along the arrow 60. A preferred mechanism in which to increase the jitter frequency is to break apart or "scramble" relatively long patterns of coded 1s and coded 0s to shorter patterns. While jitter still exists at the interface between coded 1 and coded 0 logic values, the frequency of the jitter will extend above the frequency response of the low-pass filter.

Figure 10:
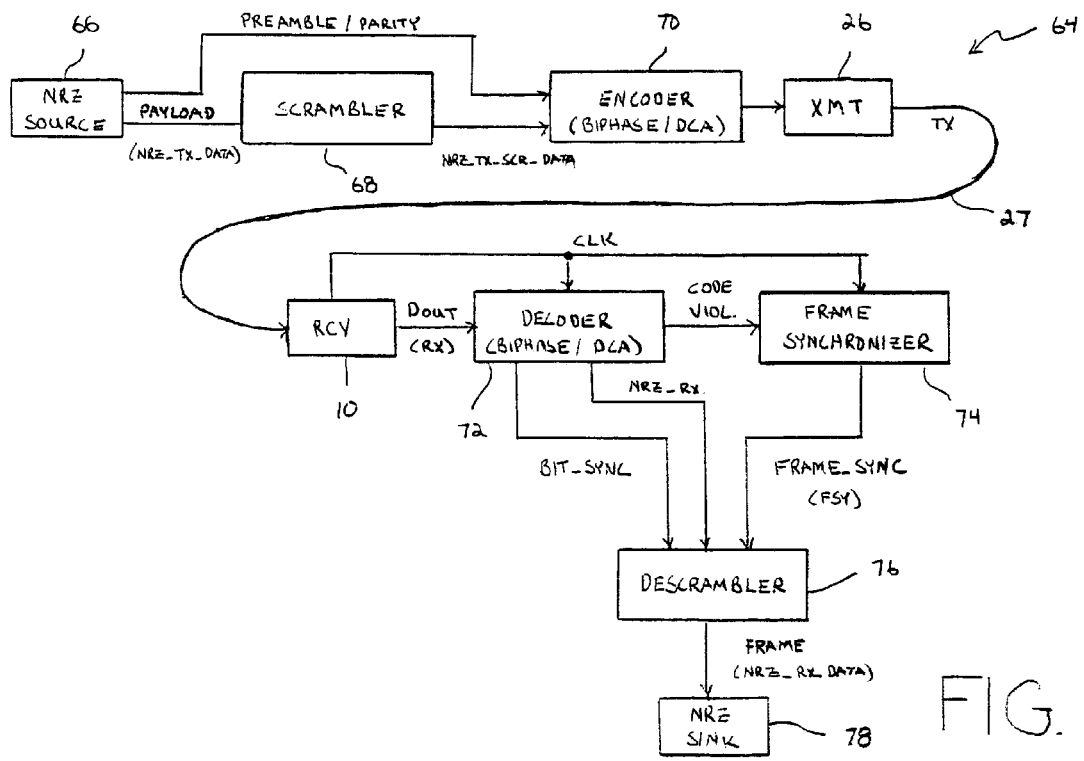
FIG. 10 is a block diagram of a communication system that utilizes a selective scrambler and descrambler to scramble and descramble the payload of each frame within the data stream and to code and decode the payload, preamble and parity of each frame within the data stream, according to a preferred embodiment.

FIG. 10 illustrates one example of implementing an improved communication system 64 that not only increases the jitter frequency, but also maintains minimal DC accumulation or baseline wander. Communication system 64 includes a NRZ source 66 that produces a plurality of frames sent as a sequence of bits, where each frame includes a payload section, a preamble section, and a parity section. Only the payload section is forwarded to a scrambler 68 as NRZ_TX_DATA. The scrambler will randomize the sequence of bit values forwarded to the scrambler by interpose dissimilar logic values in the sequence of bits by possibly inverting one or more bits stored in the n stages of the shift register. The scramble might be called upon to insert one or more dissimilar logic values in that sequence of bits if the sequence has the same logic value exceeding n number of bits. Scrambler 68 output can, therefore, be scrambled as NRZ_TX_SCR_DATA sequence of bits placed into an encoder 70 as the payload section.

Along with the payload section is the preamble and parity sections that are coded so that the code eliminates DC accumulation over one frame period—thus eliminating DC accumulation below the frame transfer rate (FSY). Preferred encoding techniques include bi-phase or DCA encoding. The scrambled and encoded payload, as well as the encoded preamble and parity for each frame, are sent to a transmitter 26. Transmitter 26 modulates the signal in whatever form necessary to forward the transmitted data stream across a transmission path 27 and into a receiver 10. Receiver 10 can demodulate the signal, slice the signal based on a decision circuit output, recover a clocking signal from the transmitted signal, and recover data using the clocking signal edges. The recovered data $D_{OUT}$ (RX) is then forwarded to a decoder 72. Decoder 72 decodes the coded signal using the clocking signal edges.

A frame synchronizer 74 is needed to determine the location of the payload section and parity section relative to a preamble section. The preamble section can be coded with a sequence of codes that is recognizable to the decoder as not fitting within the coding mechanism chosen. When the coding violation is detected, frame synchronizer 74 forwards a FRAME_SYNC (FSY) signal to descrambler 76, along with the decoded frame NRZ_RX. A BIT_SYNC signal is also sent to synchronize each bit of the decoded sequence of bits. Armed with the FRAME_SYNC and BIT_SYNC signals, as well as the decoded frame, and all of the various bits contained within the frame, descrambler 76 then descrambles the payload section only and forwards the parity and preamble sections (absent descrambling) to the NRZ sink 78 as NRX_RX_DATA.

A coding violation can be thought of as any bit sequence that will never be encountered in encoded data and, thus, can be detected as non-data by the decoder 72. For example, coding violations may be a data sequence containing pulses that are less than the minimum pulse width, pulses that are greater than the maximum pulse width, pulses that are greater than the maximum pulse width starting with the middle transition, an encoded cycle that is greater than the maximum coded cycle, or a digital sum value that is greater than +1 or less than −1. U.S. Pat. No. 6,437,710, herein incorporated by reference, describes various coding violations for DCA encoded signals, as well as biphase encoded signals.

Figure 11:
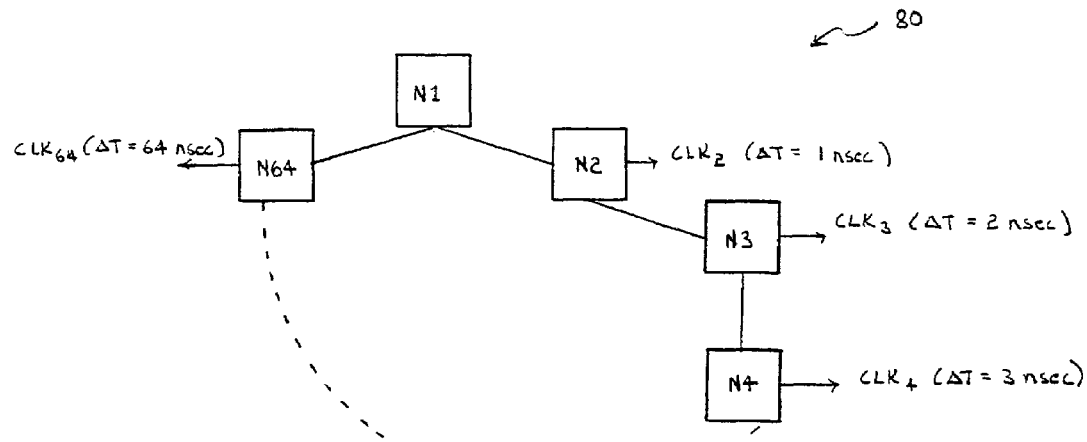
FIG. 11 is a block diagram of a communication system made up of nodes connected in a ring topology, and showing accumulated jitter as a clock is recovered from the data stream that traverses the ring.

Communication system 64 of FIG. 10 is indicative of a transmission and receiving path between a source and a sink, similar to the path between a pair of nodes of a communication system 80 of FIG. 11. Each node labeled N1-N64 includes a transceiver and various multimedia devices that source and sink the NRZ signals. For example, one multimedia device can be a CD player that samples at approximately 44.1 kHz. The CD player can stream data at, for example, 16 bits per sample audio channel (32 bits/stereo channel), resulting in a bps Baud rate across the transmission line of 32 bits/stereo sample×44.1 k sample/second=1.4122 Mbps. If FSY across the transmission path is different than the sample rate fs, then the streaming data from the multimedia device cannot be placed synchronously through the transmission line to another device (i.e., from a DVD player to a speaker). Instead, streaming data must be placed as isochronous streaming data as opposed to synchronous streaming data. Other types of data are described with reference to packetized data, which can also be placed across the network.

Each frame of data can, therefore, be sent synchronously around the loop topology from one node to another, with each frame being sent in succession. Each frame can have reserved time slots to accommodate isochronous streaming data, synchronous streaming data, packetized data, control data, etc. Alternatively, each frame can have a command byte which determines where the different types of data are present within that frame. Thus, the payload of each frame can accommodate different types of data and it is beneficial to maintain the preamble and parity sections separate from the payload. This means that the preamble and parity sections cannot be scrambled along with the payload since the boundary between data types and, specifically, the coding violation contained in the preamble, will be deleteriously mixed into the scrambled data and unrecognizable in a timed fashion by the downstream decoder. Absent any recognizable coding violation, FSY cannot be determined and, more importantly, the boundary between data types within each payload cannot be determined. Thus, indigenous to the present frame protocol, scrambling of the payload must be selectively performed without scrambling the preamble and parity sections.

As shown in FIG. 11, if the time difference between logic 1 coded bit and logic 0 coded bit relative to transitions across the reference voltage exists at non-filtered frequencies, then the time difference accumulates around the loop from one node to the next. Thus, the recovered clock from node 2 may exhibit a 1 nanosecond, for example, jitter and the jitter at the recovered clock from node 3 will be 1+1 or 2 nanoseconds of jitter. Jitter therefore accumulates to a rather substantial amount of jitter at the last node, e.g., node 64 as shown. Thus, moving the frequency response of the jitter upward so that it can be low-pass filtered is predominantly beneficial in a ring topology of numerous nodes and multimedia devices connected thereto. In a ring topology, assuming 64 nodes, the data dependent jitter can be 64 times that of a single node. The jitter clocking signal can degrade the performance of any audio converters coupled to the downstream nodes; thus, producing substantial audio affects.

Figure 12:
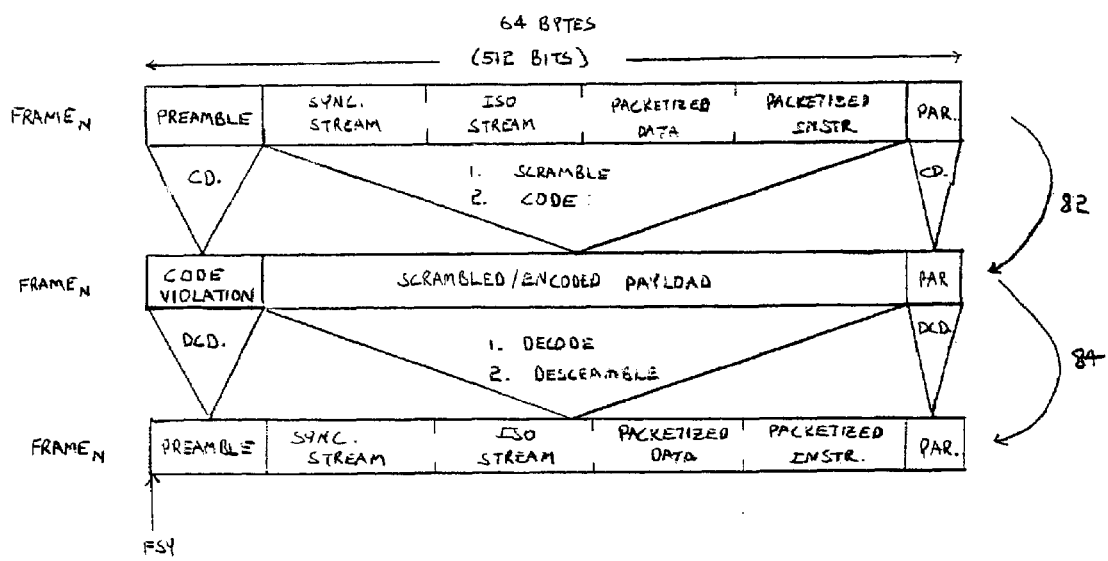
FIG. 12 is a plan diagram of a frame with a scrambled and encoded payload and an encoded preamble and parity, wherein the preamble can be discovered based on a coding violation to set the frame synchronization signal used to discern the payload from the preamble and parity section for purposes of subsequent decoding and descrambling.

FIG. 12 illustrates selective scrambling of a payload section, followed by encoding of that payload section to produce a scrambled and encoded payload within each frame. However, the preamble and parity sections are not scrambled and, particularly, the preamble section is coded with a violation. The coding and scrambling functions within a transmission path are shown by arrow 82. Detecting the code violation then allows the receiving path decoder to determine the frame sync (FSY) as to start of that frame so that the frame can be decoded, and the payload descrambled to arrive at the correct sequence of different data types within the payload. The decoding and descrambling operations are shown by arrow 84. The parity section is coded to offset any DC accumulation in the coding of the violation in the preamble and the coding of scrambled data in the payload to cause a net, DC free coded frame sent across the transmission path.

FIG. 13 is a state machine 86 that selects the various times in which a preamble (PRE_TIME) and parity (PAR_TIME) occur. State machine 86 can be used to initiate the scrambling and descrambling operations on the payload when the payload is present, and the preamble and parity sections are not. A preamble can be detected (PRE_DET) by knowing which bits in the transmission path are wrapped onto the payload to form the preamble. The preamble can be detected in the receiving path by decoding a coding violation. When a frame of, for example, 512 bits or 64 bytes is encountered, a counter 90 will count from 0 to 511 to determine the location of the preamble, payload and parity bits within the frame. A 9-bit counter 90 can encompass all 512 bits.

When a preamble is detected at the output of the receiver, for example, as the RX signal (FIG. 10), detection occurs via a coding violation, and the counter 90 is set to a certain count value. In the example shown, the count value is 004H as selected by multiplexer 92. Otherwise, the counter is incremented by 1 as shown by block 94. In a stable, latched network, counter 90 will go from 0 to 511 without any skips. State machine 86 is duplicated for both the decoder/descrambler and the encoder/scrambler since the transmission and receiving paths can operate off separate clocks. Registers 96 and 98 indicate a preamble time whenever the count value is between 000H and 003H, in this example, and the count value for a parity time is 1FFH.

FIG. 14 illustrates a scrambler circuit 100, according to one embodiment. Scrambler 100 includes a memory device made up of memory elements that can store each of the sequence of bits forwarded into scrambler circuit 100 via output circuit 106. The memory elements can be cells of random access memory (RAM), latches, registers, flip flops, and thus any device that can temporarily hold each bit of the sequence of bits. According to one example, the memory can be a shift register 102 made up of n delay stages: 102*a*, 102*b*, 102*c*, and 102*d*. Each delay stage can be formulated from a D-type flip-flop, clocked by the transmission path clocking signal, and enabled by a scrambler enable (SCR_EN) signal output from an enable circuit 104. According to one example, enable circuit 104 can be a NOR gate with the preamble and parity times input to the 2-input NOR gate. If either the parity or preamble times occur, then each of the delay stages will be disabled. Otherwise, the delay stages will operate as a shift register with the output of one stage fed to the input of the subsequent stage. The number of delay stages is equal to n, with n preferably being at or near 15. The delay stages thereby temporarily store the sequence of bits being transmitted, with the last stage and the second from the last stage input to an output circuit 106. In addition, the NRZ source data (NRZ_TX_DATA) is forwarded to output circuit 106. Output circuit 106 can be formed as a pair of exclusive OR gates 106*a* and 106*b*, whose output NRZ_TX_SCR_DATA is forwarded back to the first delay stage 102*a* input. Operation of scrambler circuit 100 can be better illustrated in reference to FIG. 19.

FIG. 15 is a truth table of the operation of output circuit 106. As shown, if the logic values of the NRZ_TX_DATA and delay stage 14 (i.e., n−1 delay stage 102*c*) are dissimilar, then the logic value from delay stage 15 (i.e., n delay stage 102*d*) is inverted and placed on the output of circuit 106 as NRZ_TX_SCR_DATA. If, however, the logic values of the NRZ_TX_DATA and delay stage 14 (i.e., n−1 delay stage 102*c*) are the same, then the logic value from delay stage 15 (i.e., n delay stage 102*d*) is placed on the output of circuit 106 as NRZ_TX_SCR_DATA without inversion. The output from circuit 106 is placed into the input of the first delay stage as well as being fed out to the transmission path. The logic value held at the nth delay stage is therefore the first bit within a sequence of n bits, and the logic value held at the n−1 delay stage is therefore the second bit within the sequence of n bits. The logic value of NRZ_TX_DATA placed contemporaneous with the first and second bits in the sequence onto the input of output circuit 106 is the nth bit within the sequence.

Figure 16:
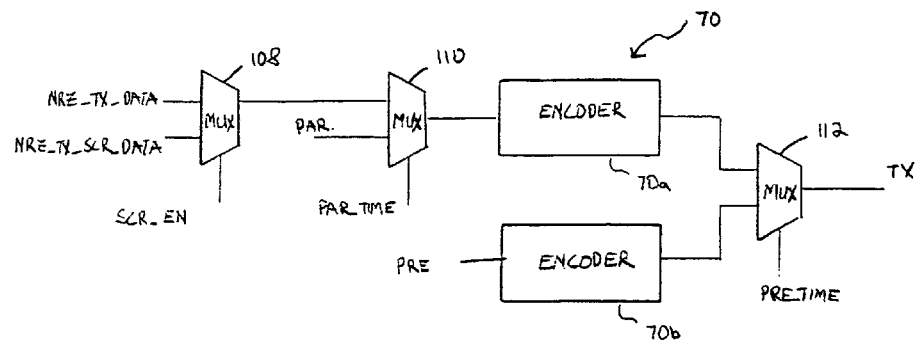
FIG. 16 is a block diagram of multiplexers used to compile the frame of scrambled and coded payload, coded parity bits, and non-coded preamble bits (if preamble bits have no DC accumulation), according to one embodiment.

FIG. 16 is a block diagram of multiplexers used to compile a frame to be transmitted to a receiver. Multiplexer 108 is used to select either the scrambled or non-scrambled data from the source or scrambler, respectively, depending on whether the scramble enable signal (SCR_EN) is active. If active, then the scrambled payload is received from the scrambler and placed into the input of multiplexer 110; if not active, then non-scrambled data (NRZ_TX_DATA) is sent. If scrambling is needed, then most likely the scramble enable signal will be active. Multiplexer 110 will then forward the scrambled data whenever the parity time is not active. Otherwise, if the parity time is active, then the parity section will be transferred via multiplexer 110 onto encoder 70. Encoder 70 will then encode the scrambled payload and non-scrambled parity sections, as well as non-scrambled preamble sections, and both are fed into a multiplexer 112. The preamble is shown to traverse a separate encoder 70*b*, and not the bi-phase/DCA encoder 70*a*. The reason for the separate encoder 70*b* is to ensure the preamble receives a code that is not recognizable as a bi-phase or DCA code, and thus constitutes a coding violation. Encoder 70*b* thereby encodes the preamble to ensure a coding violation is coded therein.

Figure 17:
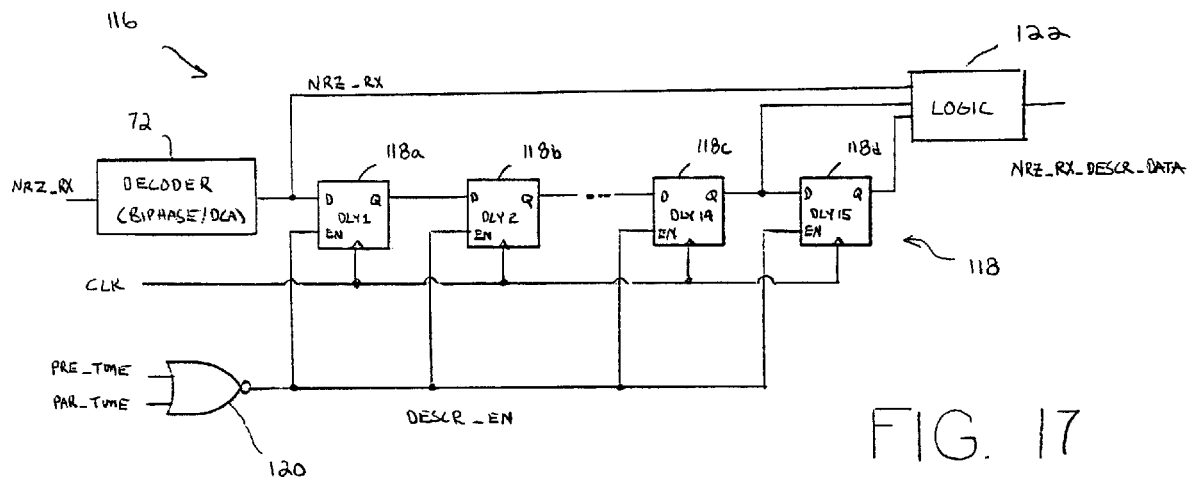
FIG. 17 is a block diagram of the descrambler circuit that selectively descrambles the payload during times when the preamble bits and the parity bits are not encountered.

FIG. 17 illustrates a descrambler circuit 116 that receives decoded data (NRZ_RX) from decoder 72. The decoded data is fed into a shift register 118, similar to shift register 100 (FIG. 14). Shift register 118 includes delay stages 118*a*, 118*b*, 118*c*, and 118*d*. The number of delay stages in shift register 118 equal the number of delay stages in shift register 102 (FIG. 14). Moreover, each delay stage 118 is similar to each delay stage 102, and is envisioned as comprising a D-type flip-flop clocked by a clocking signal within the receiving path and enabled by a descrambler enable (DESCR_EN) signal. The shift register 118 is enabled by an enable circuit 120 during times in which the preamble time and parity time are absent. An output circuit 122 receives output from the last stage and the second to the last stage, as well as input into the first stage when formulating the descrambled output (NRZ_RX_DESCR_DATA). Similar to output circuit 106 of FIG. 14, output circuit 122 is preferably made of a pair of series-coupled exclusive OR logic gates that have the same truth table as shown in FIG. 15. If the NRZ_RX is dissimilar from delay 14 output logic value, then the logic value of delay 15 is inverted and placed on NRZ_RX_DESCR_DATA. Otherwise, the logic value is delay 15 is not inverted. Details of the descrambler 116 operation is further described in reference to FIG. 19.

Figure 18:
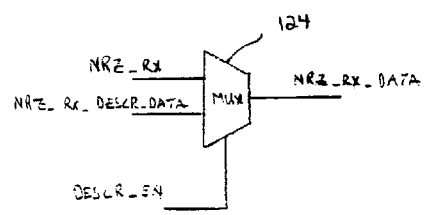
FIG. 18 is a multiplexer used to compile the frame of decoded and descrambled payload, decoded parity bits, and non-decoded preamble bits (if preamble bits have no DC accumulation), according to one embodiment.

FIG. 18 illustrates a multiplexer 124 used to select either the descrambled data from descrambler 116 or non-descrambled data (which is typically data that has not been scrambled) if the scrambling and descrambling operations are not used. The descrambled data is selected if a descrambler enable (DESCR_EN) signal is active. If so, then the descrambled data is presented as NRX_RX_DESCR_DATA to the NRZ sink 78 (FIG. 10).

Figure 19:
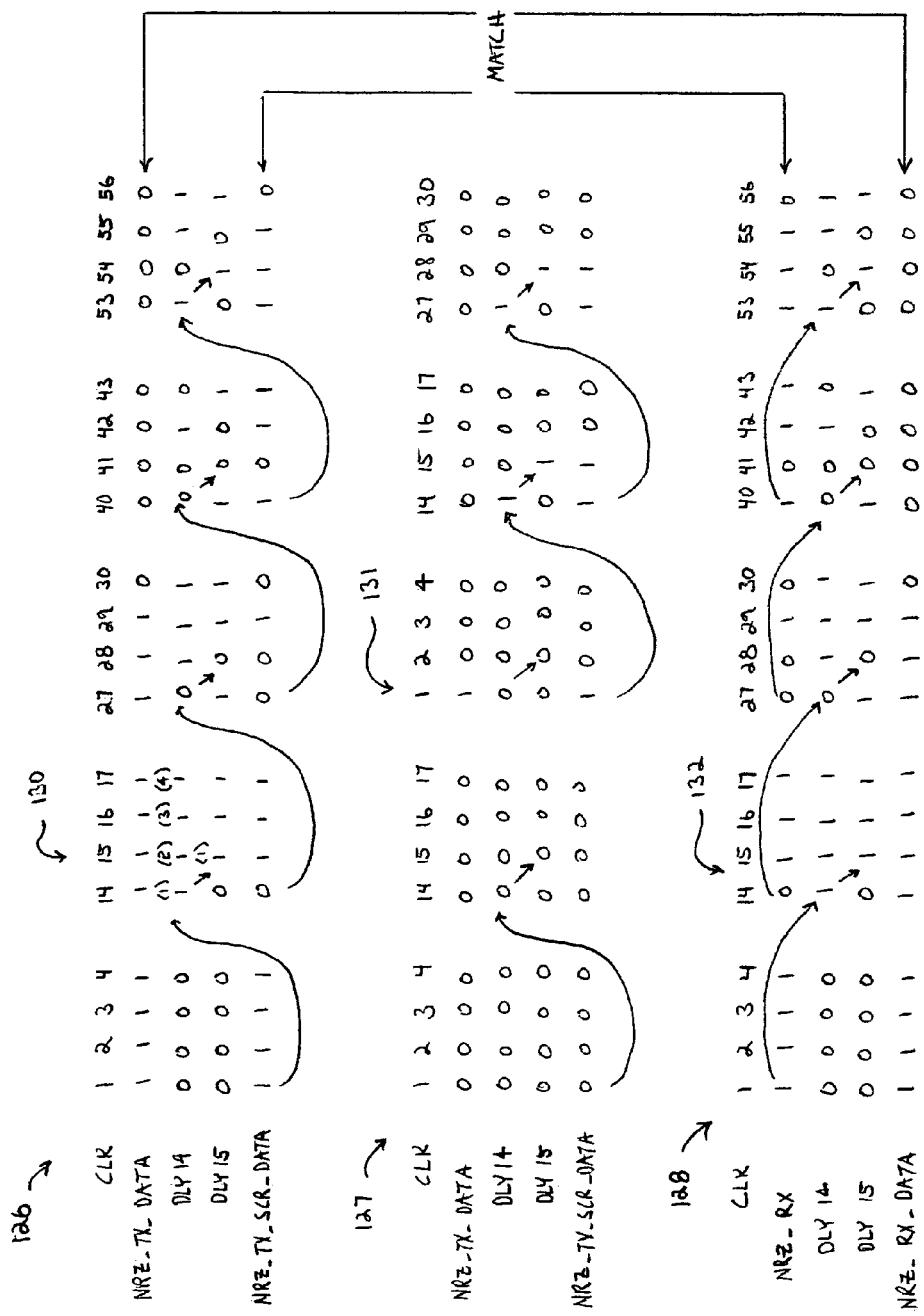
FIG. 19 is an exemplary table of logic values input and from into the scrambler and descrambler of FIGS. 14 and 17.

FIG. 19 illustrates the scrambler and descrambler operations by using one example that is shortened for brevity purposes. The scrambler operation is shown in table 126; the descrambler is shown in table 128. As shown in table 126, an incoming sequence of bits can be of the same logic value as shown by logic 1 values over 29 clock cycles for NRZ_TX_DATA. However, when referring to FIGS. 14 and 19 in combination, the first and second bits in the sequence are output from the 14th and 15th delay stages, along with the 15th bit in the sequence from NRZ_TX_DATA to formulate the inputs to output circuit 106 at the 15th clock cycle 130. Since the output circuit 106 has the truth table of FIG. 15, the logic 1 voltage value at clock 15 for the first bit in the sequence of n bits recovered from the nth delay stage (delay 15) is not inverted since the logic values of the second bit in the sequence recovered from the n−1 delay stage (delay 14) and the nth bit in the sequence from NRZ_TX_DATA are the same logic value (logic 1). However, if the second bit in the sequence (i.e., output from n−1 delay stage) is different from the logic value of the nth bit from NRZ_TX_DATA, then the logic value of the first bit would be inverted—see clock 4, for example. Table 126 illustrates the methodology by which a combination of delay elements and the output circuit prevents a sequence of bits output from the shift register from exceeding n (where n=15 in this example) number of the same logic value. By tapping the outputs from the n−1 and nth delay elements to receive the second and first bit logic values within the sequence of n bits, and logically combining those bit values with the nth bit logic value from NRZ_TX_DATA, a relatively simplistic scrambler mechanism is envisioned.

Table 127 illustrates what would occur if the scramble were initialized absent any logic 1 voltage values for NRZ_TX_DATA. Presumably no scrambling would occur in this condition. However, once a logic 1 voltage value is imparted to the incoming sequence of bits, as shown during time 131, possibly during start up, then subsequent sequences of n bits (in this example n=15) may not contain the same logic value even though the incoming sequence of n bits have the same logic value.

Table 128 illustrates the descrambling mechanism by which the scrambled data (NZR_TX_SCR_DATA) is presented as the input (NRZ_RX) to the descrambler. When referring to FIGS. 17 and 19 in combination, the scrambled data NRZ_RX is fed forward to output circuit 122, along with the output from delay 14 and delay 15 (which store the first and second logic values of the sequence of n bits). Since output circuit 122 can be envisioned as having the truth table of FIG. 15, then at the 15th (i.e., the nth) clock cycle 132, the descrambled data output from the exclusive OR gate NRZ_RX_DATA reverts back to a logic 1 voltage value. As shown, the descrambled NRZ_RX_DATA bit sequence will then match the original pre-scrambled bit sequence for NRZ_TX_DATA.

Numerous variations and modifications will become apparent to those skilled in the art once the above disclosure is fully appreciated. It is intended that the following claims be interpreted to embrace all such variations and modifications.

What is claimed is:

1. A circuit for transmitting a sequence of bits, comprising:
    a memory;
    an output circuit coupled to the memory for scrambling a payload section of a frame that includes the payload section, a preamble section, and a parity section, wherein said scrambling comprises inverting a logic value of at least one of the sequence of bits within the payload section;
    an enable circuit coupled to the memory for: (i) enabling the memory to receive the sequence of bits within the payload section of the frame, and (ii) disabling the memory during times in which the transmitting circuit is presented with the preamble and parity sections of the frame; and
    a state machine coupled to the enable circuit for detecting the times during which the transmitting circuit is presented with the preamble and parity sections of the frame.

2. The transmitting circuit of claim 1, wherein the memory comprises a shift register.

3. The transmitting circuit of claim 1, wherein the output circuit is coupled to receive the at least one of the sequence of bits from the memory, invert the logic value, and forward the inverted logic value back to the memory.

4. The transmitting circuit of claim 1, wherein the memory comprises:
    n number of flip flops coupled in series;
    wherein an input of a first flip flop in the series is coupled to an output of the output circuit; and
    wherein an output of an nth flip flop and the n−1 flip flop in the series is coupled to a pair of inputs of the output circuit.

5. The transmitting circuit of claim 1, wherein the enable circuit and the output circuit each comprise combinatorial logic.

6. The transmitting circuit of claim 1, wherein the enable circuit comprises:
    a pair of inputs; and
    an output coupled to disable outputs from the memory if the pair of inputs receive at least one signal indicating that the preamble section or the parity section is presented to the transmitting circuit.

7. The transmitting circuit of claim 1, wherein the inverted logic value is that of a first bit within the sequence if the logic values of a next consecutive bit within the sequence and an nth bit within the sequence are dissimilar.

8. The transmitting circuit of claim 1, wherein the output circuit is further coupled for not inverting the logic value of a first bit within the sequence if the logic values of a next consecutive bit within the sequence and an nth bit within the sequence are the same.

9. The transmitting circuit of claim 1, wherein the memory comprises n stages for storing each of a sequence of n bits, and wherein the output circuit comprises:
    three inputs coupled to receive a first bit from an nth stage of the n stages, a second bit from a n−1 stage of the n stages, and an nth bit of the sequence of n bits; and
    an output coupled to place the inverted logic value upon an input of a first stage of the n stages.

10. The transmitting circuit of claim 1, further comprising:
    a first encoder coupled between the output circuit and a transmission path for encoding the scrambled payload section and placing the encoded and scrambled payload section upon the transmission path; and
    a second encoder coupled between the output circuit and the transmission path for encoding the preamble section with a coding violation.

11. The transmitting circuit of claim 10, wherein the first encoder is further coupled for encoding the parity section, which is arranged in a different region within the frame than the payload section and the preamble section, and wherein the parity section is encoded with logic values that when combined with the encoded preamble section and the encoded and scrambled payload section present substantially no DC accumulation within a single said frame when received upon a receiver.

12. The transmitting circuit of claim 11, further comprising a multiplexer coupled for selectively applying the scrambled payload section or the parity section to the first encoder.

13. The transmitting circuit of claim 1, wherein the output circuit prevents a sequence of bits output from the memory from exceeding a number n of bits with the same logic value.

14. A communication system, comprising:
    a scrambler coupled to temporarily store n bits of a sequence of bits within a payload section of a frame that includes the payload section, a preamble section, and a parity section, where said scrambler inverts a logic value of a first bit within the sequence if a logic value of a next consecutive bit within the sequence and a logic value of a nth bit within the sequence are dissimilar;
    an encoder coupled to an output of the scrambler for coding the n bits;
    an enable circuit coupled to the scrambler for: (i) enabling a memory within the scrambler to receive the n bits within the payload section of the frame, and (ii) disabling the memory during times in which the communication system is presented with the preamble and parity sections of the frame;

a state machine coupled to the enable circuit for detecting the times during which the communication system is presented with the preamble and parity sections of the frame;

a transmission path coupled to an output of the encoder for receiving the coded n bits;

a decoder coupled to the transmission path for decoding the coded n bits; and a descrambler coupled to temporarily store the decoded n bits as a sequence of decoded bits and invert a logic value of a first bit within the sequence of decoded bits if a logic value of a next consecutive bit and a logic value of an nth bit within the sequence of decoded bits are dissimilar.

15. The communication system as recited of claim 14, wherein the scrambler comprises the memory coupled to temporarily store the n bits within only a payload section of a frame that comprises the payload section, the preamble section and the parity section.

16. The communication system as recited of claim 14, wherein logic one voltage values of the coded n bits transition at twice the frequency as logic zero voltage values.

17. The communication system as recited of claim 14, wherein the coded n bits incur a transition near the beginning of an m clock cycle provided a logic one voltage value occurs during the m+1 clock cycle and the sum of DC voltage values of all coded logic one and logic zero voltages values is skewed toward either the logic one or logic zero voltage value prior to the m clock cycle.

18. The communication system as recited of claim 14, wherein the transmission path is an optical medium.

19. The communication system as recited of claim 14, wherein the encoder is coupled to code an additional m bits within the preamble section of the frame that precedes the n bits within a payload section of the frame, and for coding the m bits with a sequence that is recognizable by the decoder as a coding violation to synchronize the beginning of the frame as well as the payload section within the frame.

20. The communication system as recited of claim 14, wherein the encoder is coupled to code an additional p bits within the parity section of the frame that is subsequent to the n bits within the payload section, and for coding the p bits with a sequence that maintains parity with the n bits within the payload section.

* * * * *